Dec. 7, 1926.  1,609,889
W. S. SHERMAN
LUMBER FINISHING MACHINE
Filed Oct. 22, 1924  2 Sheets-Sheet 1
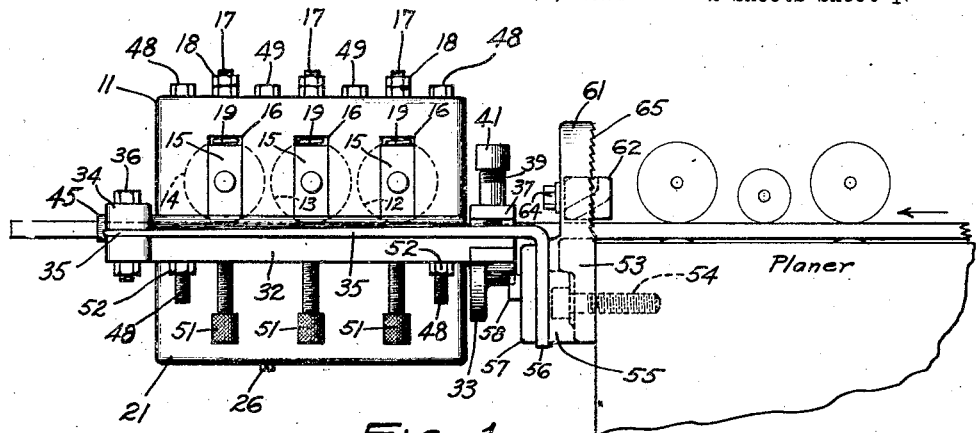
FIG. 1
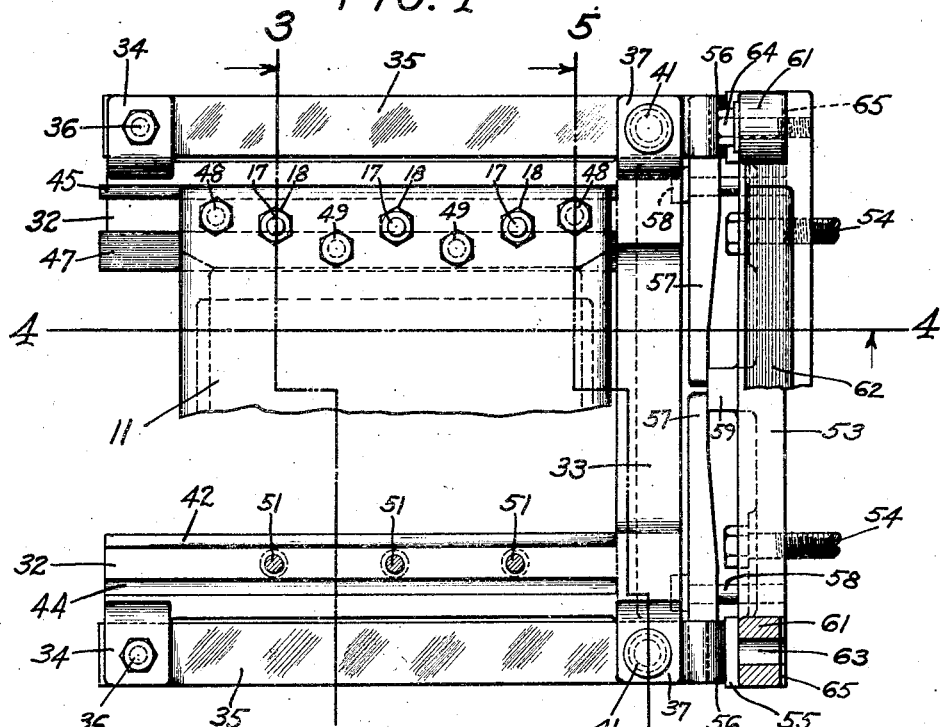
FIG. 2
FIG. 6
INVENTOR
WILLIS S. SHERMAN
ATTORNEYS

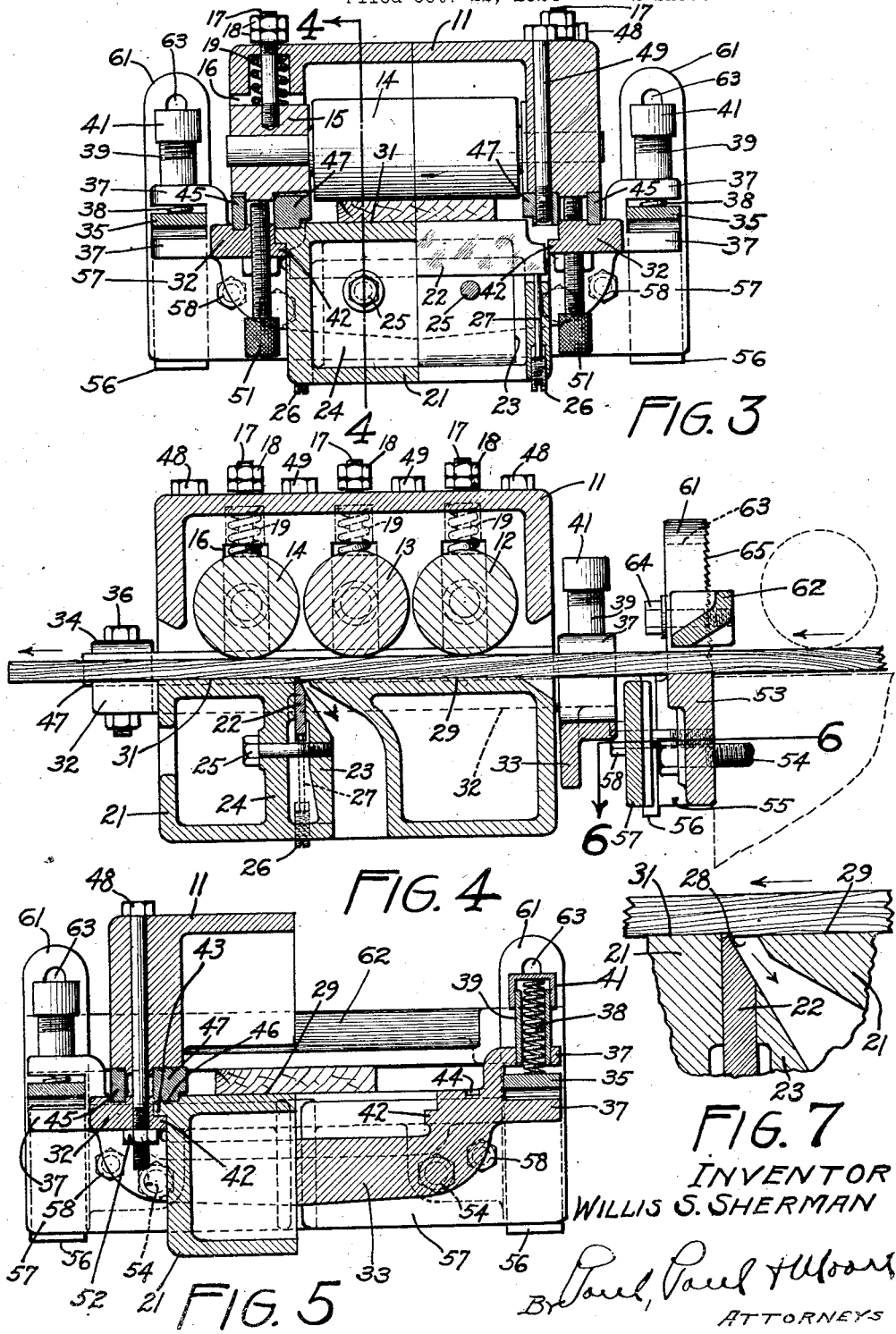

Patented Dec. 7, 1926.

1,609,889

UNITED STATES PATENT OFFICE.

WILLIS S. SHERMAN, OF MINNEAPOLIS, MINNESOTA.

LUMBER-FINISHING MACHINE.

Application filed October 22, 1924. Serial No. 745,223.

This invention relates to improvements in lumber finishing machines particularly adapted for use to smooth and finish the surfaces of pieces of lumber, such for instance, as strips of flooring, and more particularly relates to a scraping device adapted to be mounted on or adjacent the discharge end of an ordinary matcher or planer in position to receive the pieces of lumber or flooring as they are discharged from such machines, the purpose of the scraping device being to scrape and substantially polish one side of each piece as it is passed through the device.

In the manufacture of certain classes of lumber such for example, as hardwood flooring, (which is usually cut into narrow strips) it is desirable and necessary that one side of such lumber be finished to a smooth and substantially polished surface so that when it is incorporated in a building or other structure, it will present a smooth and finished appearance. The method most commonly employed at present to thus finish pieces of lumber, is to pass each piece, after having passed through a planer, matcher, or similar device, through other finishing machines such as scrapers or sanders whereby the lumber is finished and polished. The above method necessarily requires considerable time and labor as it is usually necessary to first pass the lumber through a planer or matcher and thence through a scraper, sanding machine, or similar device, before a substantially smooth and polished surface is obtained.

The novel scraping device featured in this invention may be used as an attachment to an ordinary planer or matcher. Its construction is such that when mounted on a machine of the above mentioned type, the pieces of lumber will be fed therefrom and directly into and through the scraping device, thereby dispensing with the usual operation of having to manually feed the lumber through a scraper or polishing device after having passed through the planer or matcher. By thus eliminating the above mentioned operation a considerable saving will be effected in the amount of time and labor required to finish the lumber, with a resultant decrease in the cost of manufacture.

Generally stated, this novel device employs a series of pressure rolls adapted to engage the lumber and firmly hold it against a knife block having a transverse scraper-blade arranged therein to engage one side or edge of the lumber as it is fed through the device. The knife block and roller housing are mounted in a frame which is supported by yieldable members suitably secured to the rear end of the planer or matcher. By thus yieldably mounting the device on the machine it will be free to adapt itself to any irregularities in the surface of the piece of lumber (caused by warping, etc) as it is fed therethrough, and it will also require considerably less power to scrape and finish the lumber than if the scraper blade was mounted directly on the bed of the planer or matcher. This will be clearly seen when it is understood that to scrape and finish the lumber the latter or present method, sufficient pressure must be applied to the board or strip of lumber to firmly hold it in contact with the planer bed so that the surface of the board to be scraped will be held in direct contact with the surface of the planer bed adjacent the scraper blade. By thus having to add increased pressure to the strip of lumber in order to force it firmly against the bed of the planer and the scraper blade mounted therein, there develops a tendency to retard the feed of the lumber through the planer which sometimes results in the pieces of lumber wedging with resultant damage thereto and to the machine. The above condition is eliminated by the use of this novel scraping device.

The object of the invention, therefore, is to provide an improved lumber scraping and finishing device which may be used as an attachment for an ordinary planer or matcher.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a view in side elevation of the device mounted on the rear end portion of a standard form of wood-working machine;

Figure 2 is a plan view of the device partially broken away to show the supporting frame and universal mounting therefor;

Figure 3 is a transverse sectional view on the line 3—3 of Figure 2;

Figure 4 is a longitudinal sectional view on the line 4—4 of Figures 2 and 3 showing a strip positioned in the device;

Figure 5 is a sectional view on the line 5—5 of Figure 2;

Figure 6 is a detail sectional view on the line 6—6 of Figure 4; and

Figure 7 is an enlarged detail view showing the relative position of the scraper knife and strip.

The novel lumber scraping and finishing device featured in this invention preferably comprises an upper housing 11 having a plurality of pressure rolls 12, 13 and 14, mounted therein, as particularly shown in Figures 3 and 4. Each roll is preferably mounted in bearing blocks 15 which are vertically slidable in guides 16 provided in the side walls of the housing 11. A stud 17 is secured to the upper portion of each bearing block 15 and upwardly extends therefrom through an aperture provided in the housing and has locknuts 18 terminally mounted thereon to retain it in adjusted position. Compression springs 19 are coiled about the studs 17 and are seated in sockets in the housing as shown on the left-hand side of Figure 3. These compression springs function to downwardly force the rolls 12, 13 and 14 against the strip of lumber as it is fed through the device.

The lower portion of the device preferably consists of a rectangular block 21 wherein the scraper blade 22 is clamped between a yieldable wall 23 and a relatively fixed wall 24, preferably integral with the block 21. Suitable clamping screws 25 are mounted in the wall 24 and have their ends in threaded engagement with the yieldable wall 23 so that the latter may be securely clamped against the blade 22 to hold it in adjusted operative position. Referring to the right-hand side of Figure 3 it will be noted that means are provided whereby the blade 22 may be vertically adjusted. Such means preferably consists of adjusting screws 26 mounted in threaded sockets provided in the side walls of the block 21. Pins 27 are also mounted in the side walls of the block and have their lower ends in engagement with the upper ends of the adjusting screws 26 while their upper ends bear against the lower edge of the scraper blade 22. Thus by slightly rotating the adjusting screws 26 in their sockets the cutting edge 28 of the scraper blade (see Fig. 7) may be relatively adjusted with relation to the upper bearing surfaces 29 and 31 of the block 21.

An important feature of this invention resides in the novel means provided for yieldably securing the scraper head to a wood-working machine such as a planer or matcher, as shown in Figure 1. Such means preferably consists in the provision of a supporting frame comprising spaced parallel side members 32 and a cross-member 33. Each side member 32 is provided with an outwardly extending fork 34 to which one end of a flexible member 35 is secured by means of a bolt 36. The opposite ends of the flexible or yieldable supporting members 35 are interposed between a pair of spaced lugs 37 provided on the supporting frame, and preferably have their ends downwardly bent as shown in Figure 1 and securely clamped to the planer or matcher as shown in the above figure. Thus it will be seen that the outer ends of the side members 32 of the supporting frame are secured to the flexible members 35 while the space provided between the lugs 37 at the inner end of the supporting frame will allow the supporting frame to be slightly moved vertically with relation to the inner ends of the flexible supporting members 35.

Means are preferably provided for counterbalancing the inner or receiving end of the scraper head in order that it may more readily adjust itself to any angularity or twisting which might occur in the piece of lumber. Such means preferably consists in supporting the inner end of the supporting frame upon the flexible members 35 by means of suitable springs 38 mounted in upright guides 39 secured to the upper lugs 37 as particularly shown in Figure 5. Each tubular guide 39 is provided with an adjustably mounted cap 41 whereby the inner end of the supporting frame may be properly adjusted with relation to the flexible members 35. By the use of the springs 38, the inner or receiving end of the scraper head will be carried thereby and will therefore be free to a slight vertical and also rocking movement, thereby allowing the head to readily adjust itself to any twisting or warping of the strip of lumber as it is fed through the device. If desired, however, the springs 38 may be dispensed with by constructing the flexible members 35 in such a manner as to also carry the receiving end of the scraper head.

As shown in Figures 2, 3 and 5, the means provided for securing the roller housing 11 and the knife block 21 to the supporting frame preferably consists in providing an inwardly extending tongue 42 on each of the side members 32 of the frame. The knife block 21 has a similar outwardly extending tongue 43 provided on each outer upper corner thereof and this tongue is adapted to be seated upon the similar tongue 42 of the side members 32 of the supporting frame as shown in Figures 3 and 5. A groove 44 is cut in the upper surface of each side member 32 and has seated therein a spacing bar 45 upon which the roller housing 11 is mounted. The upper surface of the knife block is provided on each side with a depression 46 wherein a relatively larger spacing bar 47 is mounted, the upper face or edge of which cooperates with the upper edge of the bar 45 to provide a supporting means for the roller housing 11. Tie bolts 48 are provided in each corner of the roller housing to securely tie the housing and knife block together as shown in Figure 5. The spacing bars 47 are preferably secured to the roller housing by means of bolts 49 as shown in Figure 3. The spacing bars 45 and 47 function to retain the rollers 12, 13 and 14 in spaced relation to the supporting surfaces 29 and 31 of the knife block. These bars are interchangeable and must be changed when changing from one thickness of lumber to another.

Means are provided whereby the spacing bars may readily and conveniently be removed without having to take the entire apparatus apart. Such means preferably consists in providing a series of adjusting screws 51 in each side member 32 of the supporting frame. When it is desired to remove the spacing bars 45 and 47 to put in a larger or smaller size to accommodate the machine for different thicknesses of lumber, the tie bolts 48 provided at each corner of the roller housing 11 will be loosened or the locknuts 52 at the lower ends thereof will be downwardly rotated on the bolts until the roller housing may be upwardly lifted with relation to the supporting frame. When the roller housing has thus been loosened from the frame the adjusting screws 51 will be rotated in the side members 32 until the roller housing will be lifted clear of the spacing bars. The bolts 49 will then be removed from the spacing bars 47 after which the four spacing bars may readily be removed and may then be replaced by smaller or larger bars as required. When the bars have thus been replaced or interchanged, the adjusting screws 51 will be rotated to allow the roller housing 11 to be fitted thereon after which the locknuts 52 on the tie bolts 48 will be tightened to securely lock the housing and knife block to the supporting frame.

The means provided for securing the scraper head to the planer or matcher on which it is to be used preferably consists of a bar 53 secured to the end of the machine by means of suitable bolts 54. This bar is provided with a raised portion 55 at each end against which the downwardly extending end portions 56 of the flexible members 35 are seated. A clamp 57 is secured to the bar 53 by means of a bolt 58 and as shown in Figure 6 this clamp has one end bearing against the end portion 56 of the flexible member 35 and the other end thereof bearing against a raised rib 59 provided on the bar. Thus when the bolt 58 is tightened, the flexible member 35 will be securely clamped to the bar. Upwardly extending lugs 61 are provided on each end of the bar 53 to provide means for supporting a guide bar 62 which functions to guide the strip of lumber into the scraper head as shown in Figures 1 and 4. Each lug 61 is provided with an elongated opening 63 adapted to receive a bolt 64 which functions to adjustably secure the guide bar thereto. One face of each lug 61 is also preferably provided with a series of small teeth 65 which function to positively prevent the guide bar from being upwardly moved when the strip of lumber is fed therebeneath. This is of considerable importance when finishing lumber which has a tendency to twist or split and wedge, as by the use of the teeth it will be impossible for the guide bar to be upwardly moved after being secured in adjusted position, thereby preventing the wedged pieces from being fed into the scraper head.

In the operation of this novel lumber scraping and finishing device, the piece of lumber is fed into the scraper head from the wood-working machine upon which the device is mounted. As it is fed into the head, the end thereof will pass beneath the rollers 12, 13 and 14 and the bearing surface 29 of the knife block and will thus be firmly pressed against the latter until the end thereof engages the cutting edge 28 of the scraper blade. By thus firmly holding the board or strip of lumber against the edge 28 of the scraper blade, the latter will remove any roughness in the surface of the board and will thereby smooth and substantially polish such surface. Thus it will be seen that while a strip of lumber is being fed through the scraper head, the lower surface thereof will be firmly held in contact with the supporting surfaces 29 and 31 so that a fine cut will be removed from the lumber by the scraper blade which will result in the lumber, when finished, being substantially smooth and polished. It will also be noted by referring to Figure 4 that the bearing surface 31 is slightly higher than the bearing surface 29, the differences in the height of the two being substantially the thickness of the cut removed from the under surface of the lumber. In actual operation, it has also been found desirable to use relatively stiffer springs on the intermediate roll 13 in order that the lumber, when fed into the device, will be firmly pressed against the bearing surface 29 adjacent the knife edge, so that any roughness appearing in the under surface of the lumber will be removed by the scraper blade, regardless of whether the lumber is warped or twisted. Thus it will readily be seen that by the employment of this novel device in conjunction with an ordinary wood-working machine that very little additional power will be required to scrape and polish the lumber as compared with the present method now employed to scrape lumber, where the scraper blade is mounted directly in the planer or matcher bed.

I claim as my invention:

1. In combination with a lumber feeder, resilient elements disposed substantially parallel with the working face of the feeder, and a lumber scraping and finishing mechanism supported upon said elements in operative relation to the feeder.

2. In combination with a machine for feeding and planing lumber, resilient elements projecting from one end of the feeder parallel with and substantially in the same plane as the working face of the feeder, a mechanism for scraping and finishing supported upon said elments in operative relation to said feeder.

3. The combination with a machine for feeding and planing lumber, resilient elements projecting from the end of the feeder, a finishing and scraping mechanism supported upon the elements in operative relation to the feeder, said mechanism connected to said elements to obtain vertical adjustment of its receiving end relative to the feeder.

4. A device of the class described, including a machine for feeding and planing lumber, horizontally alinged spring elements projecting from the end of the feeder substantially in the plane of and parallel with the working surface of the feeder and extending in direction of feed, a cutter carrying frame bridging and resting upon said elements and connected therewith at its outer end to permit vertical movement of its inner end.

5. The combination with a machine for feeding and planing lumber, of spring bars projecting outwardly therefrom, a housing carried by the outer portion of said bars, a lumber scraping knife mounted in said housing, and means for raising and lowering the inner portion of said housing to adjust it and said knife to the plane of the lumber being fed.

6. The combination with a machine for feeding and planing lumber, of spring bars projecting horizontally therefrom, a frame arranged between said bars and supported by the outer ends thereof, a housing supported by said frame and having pressure rolls and a lumber scraping knife, an adjustable means for tilting the inner portion of said housing to raise or lower said rolls and knife and adjust them to the plane of said feeding and planing machine.

7. The combination with a machine for feeding and planing lumber, of a frame comprising side rails and a housing carried thereby, means supporting the outer portion of said frame and housing on said planing machine to permit adjustment of the inner portion of said frame and housing, feed rolls and a knife blade carried by said housing, and spring pressed adjusting caps for tilting the inner end of said housing to align it with the plane of the feeding lumber.

8. The combination with a machine for feeding and planing lumber, of spring bars projecting horizontally from said planing machine and mounted for vertical adjustment thereon, a housing supported by the outer portions of said bars and having freedom of vertical movement at its inner portion between said bars, and means mounted to yieldingly engage said bars and permit the inner end of said housing to be raised or lowered and align with the feeding lumber.

9. The combination with a machine for feeding and planing lumber, of a housing supported horizontally in the path of the feeding machine and comprising upper and lower sections and pressure rolls, and a scraping device mounted respectively in said sections, removable spacing bars interposed between said sections to allow the distance between said scraping device and rolls to be varied according to the thickness of the lumber, means for clamping said sections in their adjusted position and resilient elements parallel with the working face of the feeding and planing machine substantially in a plane therewith for permitting twisting and dipping movements of the housing.

10. The combination with a feeding and planing machine, of a mechanism mounted to receive lumber from said machine and scrape and finish the surface thereof and spring elements supporting said mechanism adjacent said feeder machine to permit twisting and dipping movements of the mechanism in correspondence to the twisted or warped condition of the lumber.

11. The combination with a machine for feeding and planing lumber, of a housing having rolls and a lumber scraping device mounted therein and adapted to receive the feeding lumber between them, means for tilting the receiving end of said housing to align the space between its rolls and scraping device with the feeding lumber, and means having a beveled guiding surface for contact with the forward end of the lumber to direct it into said housing.

12. The combination with a machine for feeding and planing lumber, of a housing having rolls and a lumber scraping device mounted therein and adapted to receive the feeding lumber between them, means for tilting the receiving end of said housing to align the space betweeen its rolls and scraping device with the feeding lumber, and means having a beveled guiding surface for contact with the forward end of the lumber to direct it into said housing, said means comprising upright lugs having toothed surfaces and a guide bar engaging said toothed surfaces.

13. In combination, with a lumber feeding machine, flexible supporting members attached to the machine, horizontally aligned, a roller and knife carrying housing having one end secured to the outer ends of the flexible members, and having its inner end supported by compression springs engaging said flexible members.

14. In combination, with a lumber feeding machine, flexible supporting members attached to the machine, horizontally aligned, a roller and knife carrying housing having one end secured to the outer ends of the flexible members and having its inner end supported by compression springs engaging said flexible members, and means for changing the tension of the compression springs.

15. In combination with a lumber feeding machine, resilient brackets attached to the end of said machine providing two spaced horizontally aligned arms, a cutter frame resting upon said arms, and substantially pivotally connected at its outer end to the corresponding ends of said arms, the rear end of said frame being free for vertical movement, said flexible members lying substantially in the plane of the working surface of the feeder machine and extending in direction of feed.

16. In combination, with a feeding machine, a lumber guiding throat at the delivery end of the machine, a pair of horizontally aligned resilient members attached adjacent said throat, substantially in the plane of the working surface of said feeder machine, a planer mechanism resting upon said members and bridging, and substantially pivotally connected at its outer end to the corresponding ends of the members, said frame being unattached at its inner end adjacent said throat, and having a complemental throat leading to its planing instrumentalities.

17. A feeder, spring bars projecting from the end of the feeder substantially in the plane of the working surface of the feeder, a cutter frame bridging and supported upon the spring bars, said frame pivotally connected to said bars at a point remote from the feeder to obtain vertical adjustment of its inner end.

18. The combination with means for feeding lumber, of a lumber dressing device, bars of spring material whereon said device is mounted, said bars being adapted to yield to conform to warped pieces of lumber, the cutting edge of said dressing device being adapted for adjustment in alignment with said bars to prevent bending strain thereon when the lumber is substantially straight.

19. In an apparatus of the class described, a frame comprising spaced substantially parallel side members and a cross member, said side members having forks thereon, flexible members supported at one end and adapted to engage said forks at their opposite ends to yieldingly support said frame, a lumber dressing device mounted in said frame, and pressure means between which and said dressing device the pieces of lumber are fed.

20. In the device of the class described, a frame comprising spaced side members and a cross member, flexible means supported at one end and having bearings near the opposite ends for said side members and allowing them to rock or tilt laterally, a lumber dressing device mounted in said frame, means for holding the lumber toward said dressing device, the tilting of said frame allowing said dressing device to conform to twisted or uneven pieces of lumber.

21. In a device of the class described, a feeder, a tool support adjacent said feeder having a work-guiding surface, and fixed knife projecting above the surface, above which surface and knife the board to be finished is disposed, and toward which the board is forced, said tool support being floatingly disposed whereby said support, work-guiding surface and knife are free to assume any position conformable to the cross sectional or surface position of the board.

22. In a device of the class described, a feeder, a tool support adjacent said feeder arranged for lateral tipping and dipping movements in planes below and above the working surface of the feeder, said support having a work-guiding surface and a fixed knife projecting above said surface, above which surface and knife the board to be finished is disposed and toward which the board is forced, whereby said tool support, work-guiding surface and knife can move to assume any position conformable to the movements of the board and whereby, after the board is engaged with the knife, the elements are supported by the board.

23. In a device of the class described, a feeder, a tool support independently movably mounted for lateral tipping movements in planes below and above the working surface of the feeder, said support having a work-guiding surface and finishing tool, fixed and projecting above said surface, above which said surface and knife the board to be finished is disposed and means for forcing the board toward the knife whereby the tool support, guiding surface and tool are freely movable in unison with the work, and whereby these elements are supported by and movable with the board.

In witness whereof, I have hereunto set my hand this 20th day of October, 1924.

WILLIS S. SHERMAN.